United States Patent
Clardy et al.

(10) Patent No.: US 9,077,555 B2
(45) Date of Patent: Jul. 7, 2015

(54) CONTENT DISTRIBUTION SYSTEM

(75) Inventors: James Clardy, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1545 days.

(21) Appl. No.: 12/244,165

(22) Filed: Oct. 2, 2008

(65) Prior Publication Data

US 2010/0088697 A1 Apr. 8, 2010

(51) Int. Cl.
*G06F 15/16* (2006.01)
*H04L 12/28* (2006.01)
*H04N 21/443* (2011.01)
*G06F 9/455* (2006.01)

(52) U.S. Cl.
CPC .......... *H04L 12/2834* (2013.01); *H04N 21/443* (2013.01); *G06F 9/45533* (2013.01); *H04L 12/2801* (2013.01)

(58) Field of Classification Search
CPC ............. H04N 21/4437; H04N 21/443; G06F 9/45533; H04L 12/2834
See application file for complete search history.

(56) References Cited

U.S. PATENT DOCUMENTS

| | | | |
|---|---|---|---|
| 6,996,544 B2 | 2/2006 | Sellers et al. | |
| 2004/0199758 A1* | 10/2004 | Meaney et al. | 713/2 |
| 2004/0268347 A1* | 12/2004 | Knauerhase et al. | 718/1 |
| 2005/0155057 A1* | 7/2005 | Wei | 725/38 |
| 2005/0216912 A1* | 9/2005 | Cox et al. | 717/178 |
| 2007/0192798 A1 | 8/2007 | Morgan | |
| 2007/0271428 A1* | 11/2007 | Atluri | 711/162 |
| 2009/0150291 A1* | 6/2009 | Anson | 705/51 |
| 2009/0259834 A1* | 10/2009 | Ramos et al. | 713/1 |
| 2010/0011358 A1* | 1/2010 | Kettler et al. | 718/1 |

* cited by examiner

*Primary Examiner* — Ranodhi Serrao
*Assistant Examiner* — Thomas Richardson
(74) *Attorney, Agent, or Firm* — Haynes and Boone, LLP

(57) ABSTRACT

Distributing content over a network includes providing an information handling system (IHS) with an interface module used to couple to a signal from a content provider. A virtual IHS management engine dynamically creates a virtual IHS. The virtual IHS then receives the signal. An interface for transmitting the signal from the virtual IHS to a network is also provided.

20 Claims, 6 Drawing Sheets

CONTENT DISTRIBUTION SYSTEM

BACKGROUND

The present disclosure relates generally to the distribution of digital content, and more particularly to an information handling system for the distribution of digital content.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

As the average home becomes increasingly digital and households continue to expand in the number of IHSs in the home, there has been a growing desire to share and distribute digital content among these IHSs. This content includes television feeds, digital photos, music and/or a variety of other multi-media content. Television feeds may also vary greatly in nature—for example, they may be live, recorded, time-shifted, protected with operator-specific encryption (as in the case of pay-per-view and premium channels), and so on. Modern television feeds have also increased in their level of interactivity with the inclusion of, for example, electronic programming guides and embedded interactive features such as, for example, Java or web-links.

One group trying to address this need is the Digital Living Network Alliance (DLNA), a cross-industry collection of consumer electronics, computing, and mobile device manufacturers creating an interoperability standard for their devices to allow for ease of sharing content (http://www.dlna.org). However, the standard is primarily focused on the sharing of personal user content (e.g., content typically found on a personal computer) and does not address the needs of many digital content providers.

For digital content providers (e.g., cable television service operators, satellite television service operators, etc.), it is desirable to equip and enable customers to distribute their content within their homes to multiple end user platforms and systems. This includes the initial set up of the infrastructure, as well as the provision of administration and maintenance. It is also desirable to improve the scalability of infrastructure to allow the easy addition of more content providers and end devices.

Traditionally, in the area of television service operators, each display device requires a physical connection to the operator's signal. This is normally handled by the use of signal splitters and amplifiers (e.g., the operator sends a signal through fiber cable to a neighborhood where the signal is split to multiple households, and the operator signal coming into a household may be split and routed to each room having a television). Techniques such as these lead to signal degradation, increased installation costs, and an increased number of customer calls. Additionally, consumers wishing to view digital content on these displays typically must acquire an external set-top box that is typically rented out by the service operator (one set-top box per display). These set-top boxes extract the digital content from the RF signal supplied to the households, decrypt the signal as permitted by the user's subscription, and output results to a single television. The presence of the set-top boxes leads to added costs to the operators in the forms of administration (e.g., tracking, inventory, etc.), installation (e.g., service trips into the field to install, analyzing of signal degradation to ensure digital content can still be extracted, etc.), and maintenance (e.g., repairs, replacements, etc.) of the set-top boxes.

Accordingly, it would be desirable to provide for improved acquisition, storage, and distribution of digital content.

SUMMARY

One embodiment accordingly, provides an IHS comprising an interface module operable to couple to a signal from a content provider, at least one virtual IHS operable to receive and transmit the signal from the content provider, a virtual IHS management engine operable to dynamically create and manage virtual IHSs, and an interface for transmitting the signal from the virtual IHS to a network.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network gateway, server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

In an embodiment, the present disclosure features a media gateway that provides improved distribution of digital content. The media gateway is a specific type of IHS well-suited for sharing and distributing digital content on a home network. It acts as a single point of contact, interface, or delineation between a service provider and an internal digital house network infrastructure within a household. An interface module within the media gateway, also referred to as a content acquisition front-end (CAFE), may be used to convert the operator's RF signal into a digital signal and that signal may be supplied to other building blocks within the media gateway. The media gateway may then convert the signal into network IP packets (following the DLNA standard, extended as may be required or desired) that are accessible by end nodes and platforms inside the home network, thereby greatly reducing the amount of times a signal needs to be split and thereby improving signal quality. Thus, the media gateway provides what may be referred to as a 'single demarcation' point between the service provider and the home network.

The media gateway may utilize virtualization technology to improve the scalability of display devices within a household. By dynamically creating virtual IHSs that appear as set-top boxes to the operator (in conjunction with the use of additional CAFE modules), the media gateway may quickly and easily increase the number of supported display devices having their independent content feeds from the service operator. Such techniques allow consolidation of all of the set-top boxes previously required within a home into a single machine, improving administrative, installation, and maintenance costs.

Figure 1:
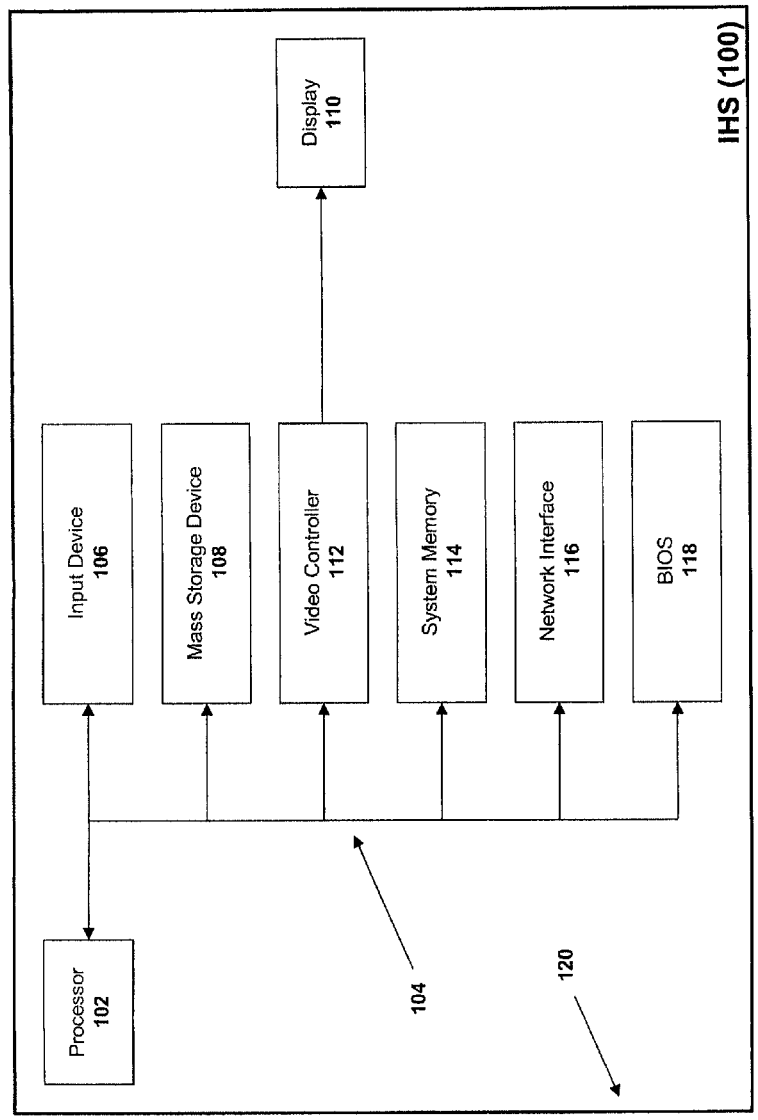
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, network attached storage (NAS) devices, storage area network (SAN) devices, internet Small Computer System Interface (iSCSI) devices, ramdisk devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. A network interface 116 is coupled to processor 102 and may provide, for example, a communications link between devices outside the IHS 100 and components of the IHS 100, and/or perform other network interface functions known in the art. A basic input/output system (BIOS) 118 is coupled to processor 102 and may, for example, identify and initiate hardware components upon the startup of the IHS 100, and/or perform other BIOS functions known in the art. In an embodiment, a chassis 120 houses some or all of the components of IHS 100. However, in an embodiment, components such as, for example, the mass storage device 108, may be coupled to the IHS 100 via an I/O device such as, for example, a Fiber-Channel Host Bus Adapter (HBA), IP networks such as iSCSI, an External Serial Advanced Technology Attachment (eSATA), a Universal Serial Bus (USB), a 1394 interface, and/or a variety of other devices known in the art. It should be understood that other buses and intermediate circuits can be deployed between the components described above and processor 102 to facilitate interconnection between the components and the processor 102.

In an embodiment, the IHS 100 may include a virtual IHS and/or a plurality of virtual IHSs, some of which may be identical to each other with regard to, for example, virtual hardware and/or software on the virtual IHSs, and some of which may be different from each other with regard to, for example, virtual hardware and/or software on the virtual IHSs. In an embodiment, a virtual IHS is a software implementation of a physical IHS that executes programs like the physical IHS. For example, a virtualization layer may be installed on the IHS 100 that allows multiple operating systems to run concurrently within virtual IHSs on the IHS 100, dynamically partitioning and sharing the available physical resources of the IHS 100 such as, for example, the CPU, storage, memory, I/O devices, and/or a variety of other resources known in the art. In an embodiment, while the virtual IHS runs on the IHS 100, it behaves as though it were a separate IHS. In an embodiment, a plurality of virtual IHSs may be different from each other with regard to operating system configuration information such as, for example, IHS name, user accounts, network settings, etc., even though the plurality of virtual IHSs are identical in every other respect.

Figure 2:
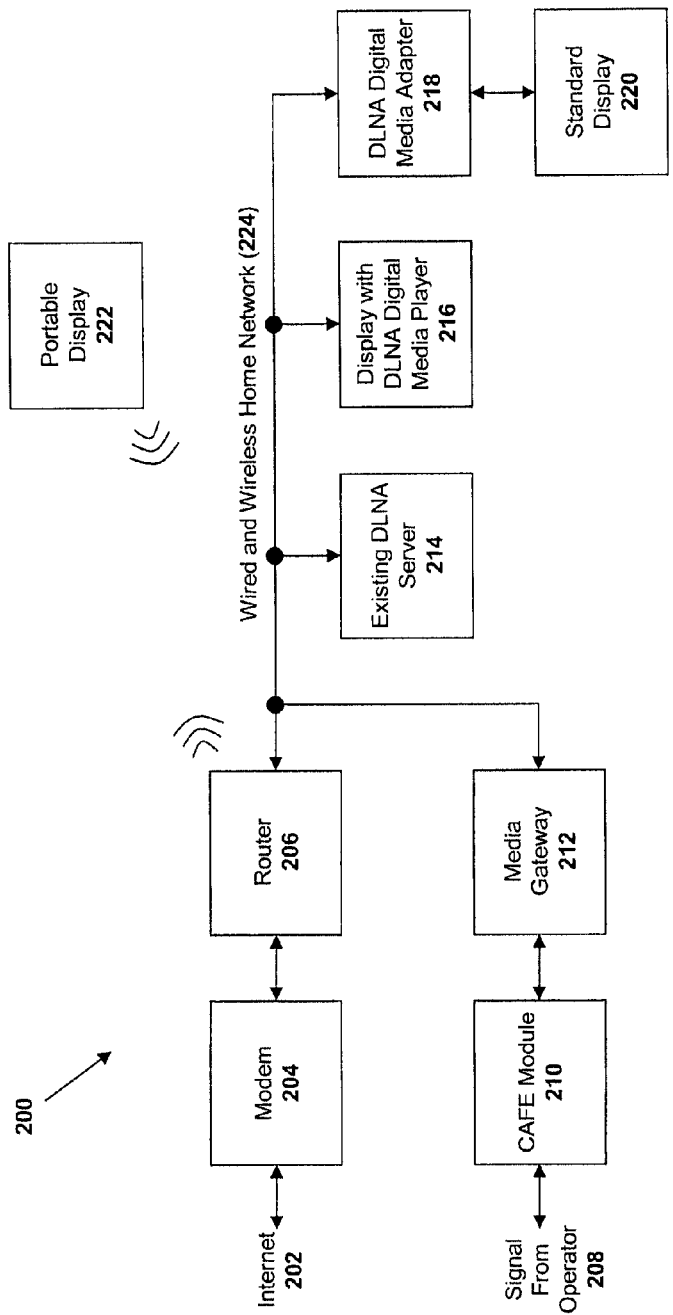
FIG. 2 is a schematic view illustrating an embodiment of a network environment.

FIG. 2 illustrates an exemplary embodiment of a network environment 200. In an embodiment, a home network 224 is controlled by a router 206. The router 206 provides access to the Internet 202 through a modem 204. In other embodiments, the router 206 and modem 204 may be replaced with other suitable network infrastructure devices, such as a switch, a hub, a wireless access point, etc. The communication interfaces used to implement the home network 224 may include wired interfaces such as Ethernet interfaces compliant with the Institute of Electrical and Electronic Engineers (IEEE) 802.3x series of standards or Universal Serial Bus (USB) interfaces, powerline interfaces such as Homeplug AV, and wireless interfaces such as wireless local area network (WLAN) interfaces compliant with the IEEE 802.1x series or 802.11x series of standards or wireless personal area network (WPAN) interfaces like those employed in the Bluetooth series of standards.

In an embodiment, a signal 208 supplied by a digital content provider such as, for example, a cable operator, is coupled to a CAFE module 210 which in turn is coupled to a media gateway 212, each described in more detail below. The media gateway 212 is also coupled to the home network 224, allowing access to the media gateway 212 by devices such as a display with an embedded DLNA digital media player 214, a standard display 220 coupled to an external DLNA digital media adapter 218, a portable display 222, and/or a variety of other devices known in the art. In an embodiment, any devices supporting the DLNA profiles for media controller playback are supported (e.g., an IHS with appropriate software). In an embodiment, an existing DLNA server 214 is coupled to the home network 224 as well. In an embodiment, a DLNA server may be any device supporting the DLNA profiles for media serving (e.g., an IHS with appropriate software). In an embodiment, multiple media gateways and DLNA servers may co-exist on the network at the same time. Displays 216, 218 and 222 are operable to access digital content provided by both the media gateway 212 and the DLNA server 214.

Figure 3:
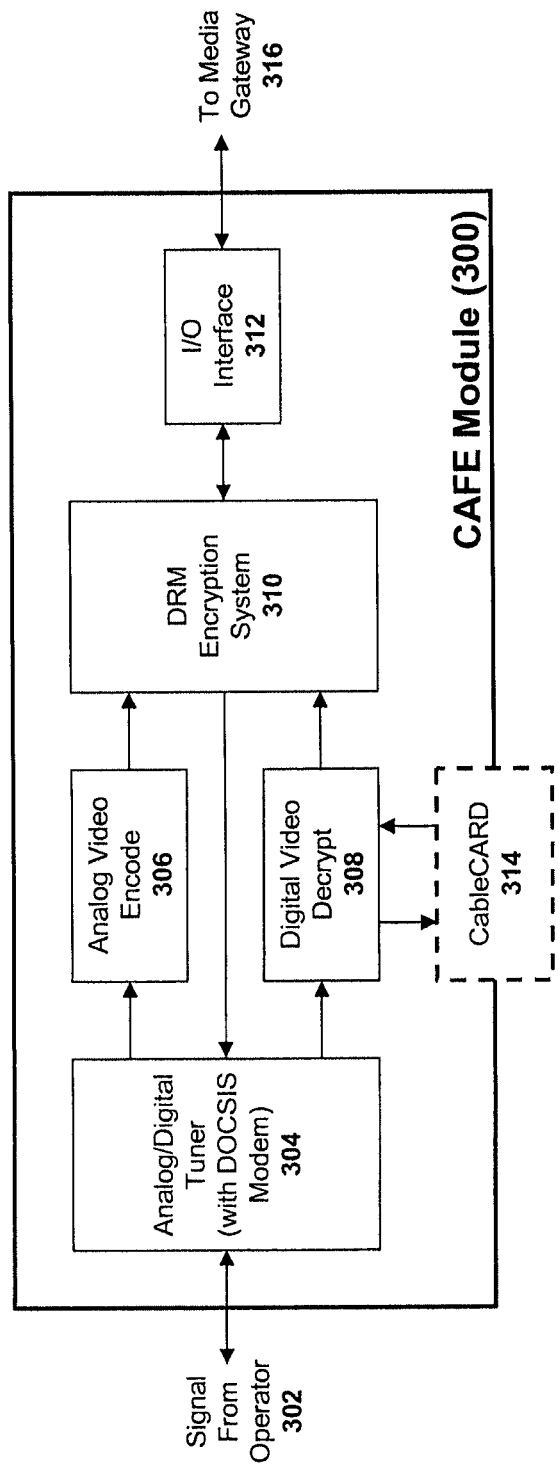
FIG. 3 is a schematic view illustrating an embodiment of an interface module.

Referring to FIG. 3, a CAFE module 300, which may be the CAFE module 210 of FIG. 2, is illustrated. In one embodiment, the CAFE module 300 includes an analog/digital tuner with a Data Over Cable Service Interface Specification (DOCSIS) modem 304 that is operable to receive a signal from an operator 302 (e.g., the signal 208 of FIG. 2). The tuner 304 may be a single integrated silicon solution or may consist of multiple pieces of silicon performing a similar function (e.g., a digital tuner with a DOCSIS modem and a separate analog tuner). One of skill in the art will recognize that the tuner 304 need not be limited in the type and quantity of functions(e.g., multiple digital tuners with no analog tuners or modem, a single digital tuner with modem, a dual analog tuner with internal signal splitter, etc.). An analog video encoder 306 is coupled to the tuner 304. Analog signals received by the tuner 304 may be sent to an analog video encoder 306 and converted into a standard digital signal. One of skill in the art will recognize that all functions of the CAFÉ module 300, after the initial RF interface, may be implemented by a single digital signal processor of sufficient bandwidth, thereby enabling the CAFÉ module 300 to be software defined. A digital video decrypter 308 is coupled to the tuner 304. Encrypted digital signals received by the tuner 304 may be sent to a digital video decrypter 308 and converted into a standard digital signal. In an embodiment, the digital video decrypter may be connected to an externally accessible CableCARD or DCAS module 314 containing operator-specific encryption/decryption keys and security. In an embodiment, the CableCARD module 314 may be provided by the service operator. A digital rights management (DRM) encryption system 310 is coupled to the analog video encoder 306 and the digital video decrypter 308. The standard digital signals may be received and encrypted by the DRM encryption system 310. Many standards are available for the DRM encryption system 310, including Microsoft's proprietary WM-DRM encryption or Advanced Access Content System (AACS) encryption based on the Advanced Encryption Standard (AES). This encryption allows the DRM requirements for each service operator to be met, while standardizing on a single DRM scheme for the media gateway and the client devices attached to the home network. The DRM encryption system 310 is coupled to an I/O interface 312 to allow for communication with a media gateway 316, which may be the media gateway 212 of FIG. 2, through standard audio, video, and data streams. This interface may be selected from a number of standards, such as, for example, the USB or the Peripheral Component Interconnect Express (PCIe) standards. In an embodiment, the DRM encryption system 310 may also be coupled with the DOCSIS modem in the tuner 304 to allow for two-way communication with the operator 302. This two-way communication may facilitate the new interactive digital content provided by service operators (e.g., electronic program guides and video-on-demand). The CAFE moduel 300 may be external and modular in design (e.g., similar in nature to the PC Card or ExpressCard form factors), may be incorporated into other designs (e.g., components integrated directly into the media gateway 316), combinations thereof, and/or in a variety of other structures known in the art.

Figure 4:
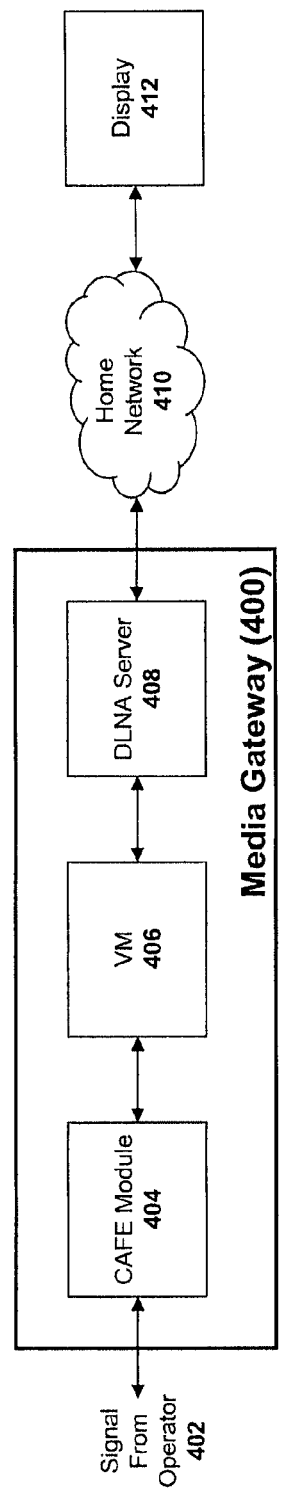
FIG. 4 is a schematic view illustrating an embodiment of a media gateway coupled to a display through a network.

FIG. 4 is a diagram illustrating an exemplary embodiment of a media gateway 400 coupled to a display 412 through a home network 410. In an embodiment, the media gateway 400 may be the media gateways 212 and/or 316 of FIGS. 2 and 3. In an embodiment, the home network 410 may be the home network 224 of FIG. 2. In an embodiment, the display 412 may be the displays 216-222 of FIG. 2. In the embodiment illustrated in FIG. 4, the media gateway 400 includes an integrated CAFE module 404, which may be the CAFE modules 210 and/or 300 of FIGS. 2 and 3. The CAFE module 404 receives a signal from the operator 402, which may be the operator 208 and/or 302 of FIGS. 2 and 3, and converts it to standard audio, video, and data streams, as described above. A virtual IHS or virtual machine (VM) 406 is coupled to the CAFE module 404. The streams are received from the CAFE module 404 by the VM 406 for interpretation. The method of interpretation may vary based on the operator's system (e.g., OpenCable vs. proprietary cable vs. satellite), and each VM may be customized accordingly. In an embodiment, the VM 406 is configured to mimic the design of cable set-top boxes following the OpenCable Application Platform (OCAP) or tru2way standard (http://www.tru2way.com). A DLNA server 408 is coupled to the VM 406. VM 406 provides the interpreted streams to the DLNA server 408. The DLNA server 408 may be implemented as software running on the media gateway 400 outside of the VM 406, as another VM, and/or using a variety of other methods known in the art. The DLNA server 408 is coupled to the home network 410, which allows other devices on the home network 410 such as the display 412 to access the digital content originally received through the signal from the operator 402. In an embodiment, a user of the display 412 may interact with the display 412 using, for example, a remote control, much as if a set-top box were connected directly to the display.

Figure 5:
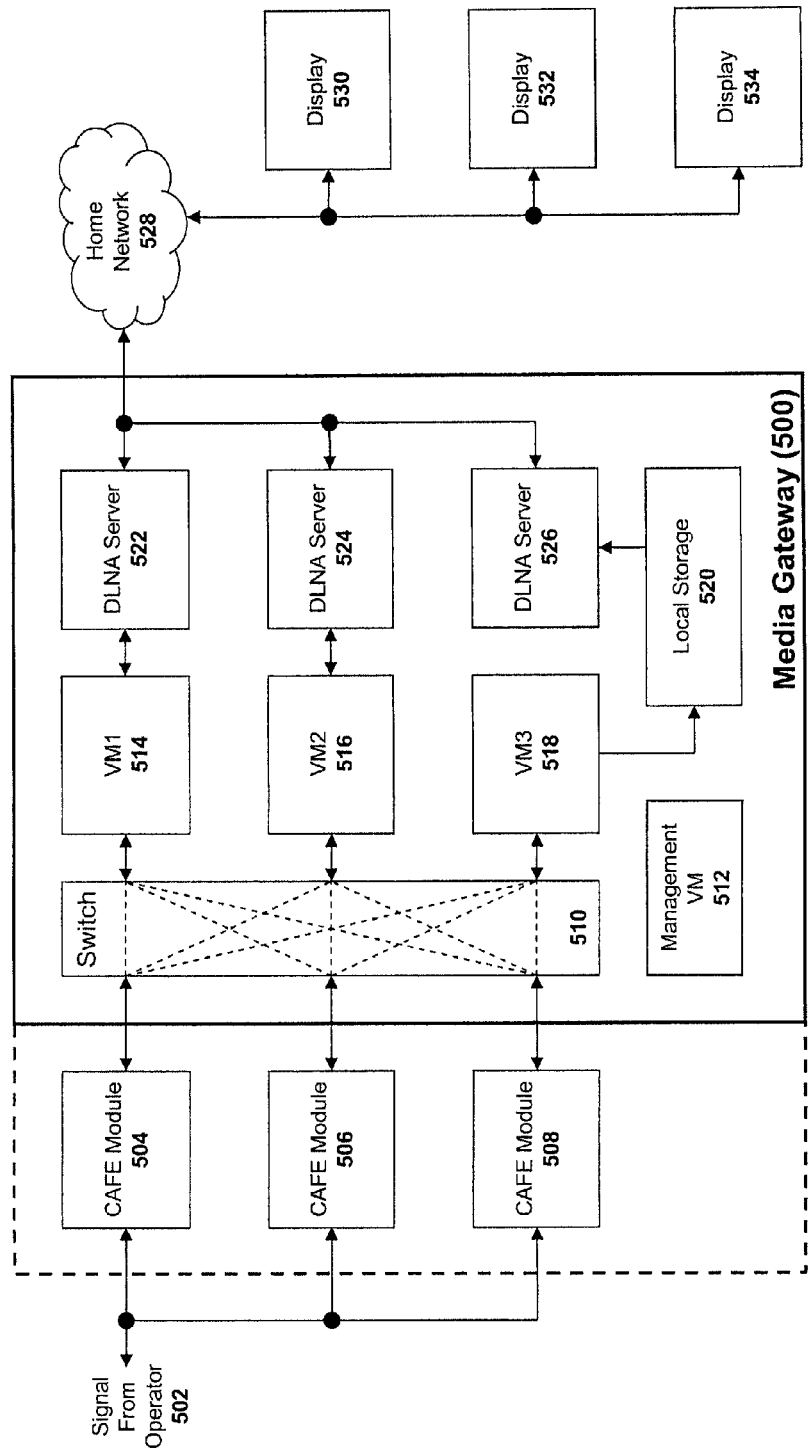
FIG. 5 is a schematic view illustrating an embodiment of a media gateway comprising a plurality of interface modules coupled to a plurality of displays through a network.

Referring now to FIG. 5, an exemplary embodiment of a media gateway 500, which may be the media gateways 212, 316 and/or 400 in FIGS. 2, 3 and 4, is illustrated in an environment with multiple CAFE modules 504-508, which may be the CAFE modules 210, 300 and/or 404 in FIGS. 2, 3 and 4, and multiple displays 530-534, which may be the displays 216-222 and/or 412 of FIGS. 2 and 4. In the illustrated embodiment, the media gateway 500 includes a plurality of CAFE modules 504, 506 and 508. Each of the CAFE modules 504-508 are coupled to the signal from the operator 502, which may be the operator 208, 302 and/or 402 of FIGS. 2, 3 and 4. The CAFE modules 504-508 are also coupled to a switch 510. The switch 510 is coupled to VMs 514-518, each of which may be, for example, the VM 406 of FIG. 4. The standard audio, video and data streams, described above, are received from the CAFE modules 504-508 by the VMs 514-518. In an embodiment, the switch 510 may be implemented in software and allow for any CAFE module to be coupled to any VM 514-518. In an embodiment, the switch 510 may be controlled through a virtual IHS management engine, also referred to as a management VM 512, that allocates resources in the media gateway 500 as needed. In an embodiment, this allocation of resources by the management VM 512 comprises many additional functions such as, for example, the ability to dynamically create, destroy, save, and restore the VMs. These abilities may increase the scalability of the media gateway 500. In an embodiment, if more CAFE modules are added (or if the modules include multiple tuners), such additions may be accommodated by adding/creating VMs. In an embodiment, if one VM crashes, a working snapshot of the VM may be restored, minimizing down-time, reducing the quantity of service calls, and improving the overall user experience. In an embodiment, management VM 512 may also perform a variety of miscellaneous functions, such as, for example, the resolution of scheduled recording conflicts, automated backups, garbage collection to recover space used by old, unneeded recordings, and general system maintenance. In an embodiment, management VM 512 may coordinate tasks among all VMs such as, for example, starting an unused VM to record a program in the background, and the task may have been initiated on a VM that is not the VM executing the task (i.e., maximizing the use of VM resources). The management VM 512 may be implemented as a VM, a program running directly on the media gateway's operating system, combinations thereof, and/or in a variety of other manners known in the art. In the illustrated embodiment, VM1 514 is coupled to DLNA server 522 and VM2 516 is coupled to DLNA server 524. In an embodiment, the DLNA servers 522-526 may be the DLNA server 408 of FIG. 4. In an embodiment, the coupling of VMs 514-516 to DLNA servers 522-524 need not be one-to-one (e.g., multiple VMs may be coupled to a single DLNA server). In an embodiment, VM1 514 may be used to stream a live television feed and VM2 516 may be used to stream a time-shifted television feed. VM3 518 is coupled to local storage 520 located within the media gateway 500. In an embodiment, local storage 520 may be used to record a live television feed for later viewing. Local storage 520 is also coupled to DLNA server 526. In an embodiment, the DLNA sever 526 may be used to stream a television feed that had previously been recorded to local storage 520. In an embodiment, the DLNA sever 526 may be used to stream content acquired from the Internet which may or may not have been downloaded previously to local storage 520. In an embodiment, the DLNA server 526 may act as a proxy for live audio/video services on the Internet (e.g., YouTube), enabling their delivery to DLNA devices by the home network. In an embodiment, the DLNA server 526 may be used to distribute music, pictures, videos and/or a variety of other digital content known in the art. The outputs of DLNA servers 522-526 are coupled to the home network 528, which may be the home network 224 and/or 410 of FIGS. 2 and 4. Displays 530-534, which may be the displays 214-222 and/or 412 of FIGS. 2 and 4, are also coupled to the home network 528. In an embodiment, displays 530-534 may stream any of the digital content available from the DLNA servers 522-526. In an embodiment, the coupling of displays 530-534 to DLNA servers 522-526 need not be one-to-one (e.g., multiple displays may be coupled to a single DLNA server to view the same live television feed).

Figure 6:
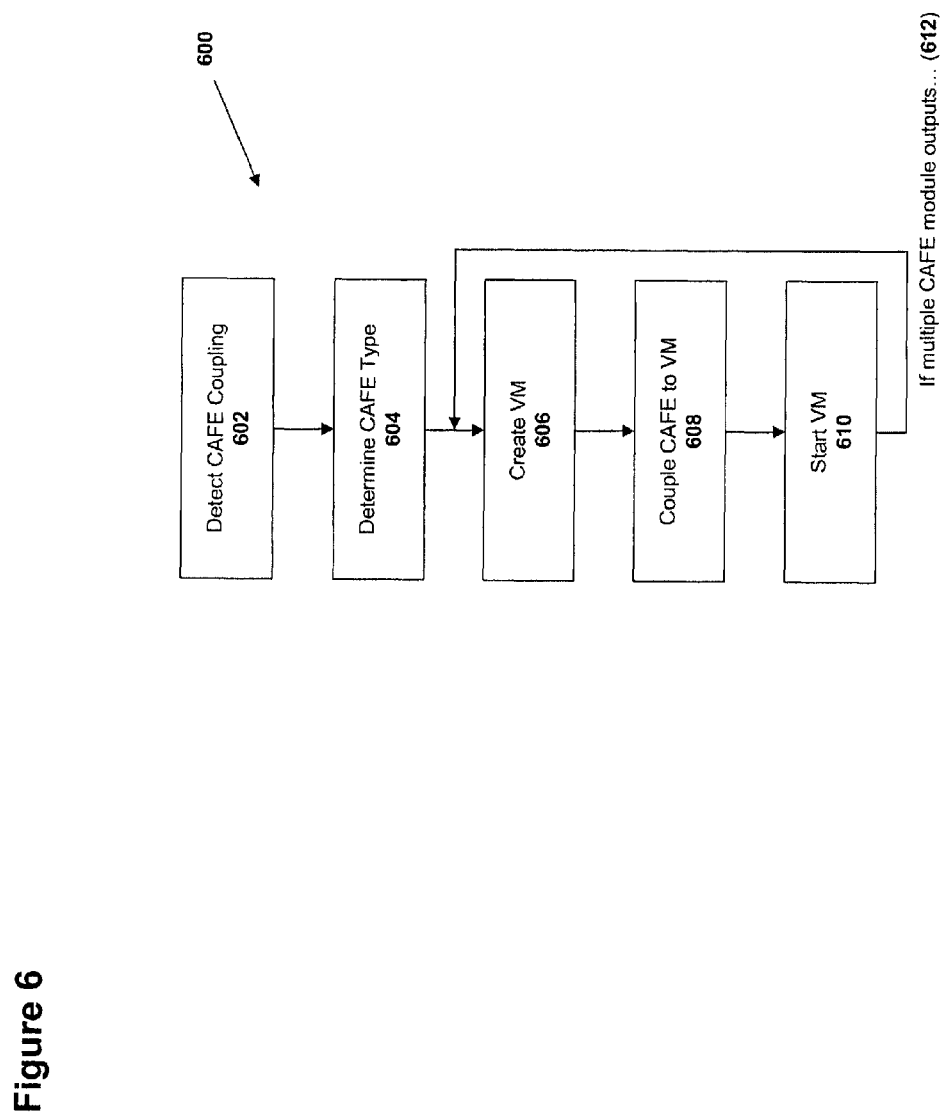
FIG. 6 is a flow chart illustrating an embodiment of a method for the dynamic creation of virtual IHSs upon coupling of an interface module to a media gateway.

Referring now to FIG. 6, a method 600 for the dynamic creation of VMs upon coupling of a CAFE module to a media gateway is illustrated. The method 600 begins at block 602 where a media gateway (e.g., the media gateways 212, 316, 400 and/or 500 in FIGS. 2, 3, 4 and 5) detects the coupling of a CAFE module (e.g., the CAFE modules 210, 300, 404 and/or 504-508 in FIGS. 2, 3, 4 and 5). In an embodiment, the detection may be accomplished through a communications protocol (e.g., standard USB or PCIe messaging), dedicated presence signals, and/or a variety of other means known in the art. The method 600 then proceeds to block 604 where the media gateway determines the type and characteristics of the CAFE module. In an embodiment, this information may be determined through a communications protocol (e.g., standard USB or PCIe messaging), a dedicated sideband interface, and/or a variety of other means known in the art. The method 600 then proceeds to block 606 where a media gateway creates a VM for a tuner contained within the CAFE module based on the information obtained in block 604. In an embodiment, the media gateway may create the VM by cloning it from a library of pre-made VMs. In an embodiment, the library may contain VMs based on the vendor of the CAFE module, the service operator, the type of tuner, and/or a variety of other characteristics known in the art. The method 600 then proceeds to block 608 where the media gateway couples a CAFE module output to a VM. In an embodiment, a CAFE module output corresponds with a tuner contained within the CAFE module. The method 600 then proceeds to block 610 where the media gateway starts the VM coupled to the CAFE module in block 608. In an embodiment, the VM may behave as a set-top box from a service operator's standpoint and automatically download, extract, and install a service operator's software from an operator's signal. In an embodiment, the VM may be set up with software already installed. In an embodiment, the media gateway may couple the VM to a DLNA server. In an embodiment, if the CAFE module contains multiple outputs 612, the method 600 repeats blocks 606-610 until all outputs have been coupled to a VM. Thus, a system and a method are provided that allow for the improved distribution of digital content.

In another embodiment, the media gateway may include components that enable a variety of other functionality such as, for example, emergency alerts (e.g., via service interrupts to clients on the home network), closed captioning, parental controls, content encryption (e.g., the encrypting of premium content sent to the home network), and managing the quality of service on the home network.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS) comprising:
   a content acquisition software module that is configured to receive a content feed signal from a content provider device through an external network and convert the content feed signal to an audio stream and a video stream;
   a virtual IHS management software engine that is configured to dynamically create and manage virtual IHSs;
   a virtual IHS that was created by the virtual IHS management software engine from a library of pre-made virtual IHSs based at least in part on a tuner included in the content acquisition software module, wherein the virtual IHS is configured to retrieve and install content provider software from the content provider device such that the virtual IHS is configured to receive the audio stream and the video stream from the content acquisition module and transmit the audio stream and the video stream to a server, and wherein the virtual IHS is configured to operate such that the virtual IHS appears as a set-top box to the content provider device through the external network; and
   an interface for transmitting the audio stream and video stream from the server to at least one display over an internal network.

2. The system of claim 1, wherein the content acquisition software module is included in an external, removably insertable form factor.

3. The system of claim 1, further comprising:
   a plurality of content acquisition software modules that are each configured to receive the content feed signal; and
   a respective virtual IHS that is coupled to each of the plurality of content acquisition software modules and that is configured to receive the audio stream and the video stream from that content acquisition software module.

4. The system of claim 3, wherein the content feed signal includes a plurality of television feeds, and wherein a first virtual IHS that is coupled to a first content acquisition software module of the plurality of content acquisition software modules is configured to receive and transmit the audio stream and the video stream from a first television feed of the plurality of television feeds, and wherein a second virtual IHS that is coupled to a second content acquisition software module of the plurality of content acquisition software modules is configured to receive and transmit the audio stream and the video stream from a second television feed of the plurality of television feeds.

5. The system of claim 1, wherein the content acquisition software module comprises a plurality of tuners, and wherein the system further comprises:
a respective virtual IHS for each of the plurality of tuners, wherein each respective virtual IHS is coupled to the content acquisition software module and was created by the virtual IHS management software engine based at least in part on a respective one of the plurality of tuners included in the content acquisition software module.

6. The system of claim 1, wherein the content acquisition software module comprises a modem for two-way communication with the content provider device.

7. The system of claim 1, wherein the content acquisition software module comprises an analog encoder that is configured to receive non-digital signals.

8. The system of claim 1, wherein the content acquisition software module is configured to decrypt signals encrypted with operator-specific algorithms.

9. The system of claim 1, wherein the content acquisition software module is configured to encrypt signals transmitted to the virtual IHS.

10. The system of claim 1, wherein the virtual IHS management engine is configured to coordinate functions among a plurality of virtual IHSs.

11. The system of claim 10, wherein the virtual IHS management software engine is configured to resolve recording conflicts.

12. A method for transmitting a content provider signal, the method comprising:
detecting a content acquisition module that includes a tuner;
creating a virtual information handling system (IHS) from a library of pre-made virtual IHSs based at least in part on the tuner included in the content acquisition module and coupling the virtual IHS to the content acquisition module, wherein the virtual IHS is configured to appear as a set-top box to a content provider device through an external network and operate to automatically retrieve and install content provider software from the content provider device;
receiving a content feed signal provided from the content provider device over the external network and through the content acquisition module at the virtual IHS, wherein the content feed signal includes audio data and video data;
interpreting the content feed signal by the virtual IHS to provide an interpreted content feed signal;
transmitting the interpreted content feed signal from the virtual IHS to a server; and
transmitting the interpreted content feed signal from the server to at least one display over an internal network.

13. The method of claim 12, wherein the detecting the interface module is selected from the group consisting of: detecting the interface module by detecting a communications protocol, detecting the interface module by detecting a dedicated presence signal, and combinations thereof.

14. The method of claim 12, wherein the determining the type of the interface module is selected from the group consisting of: determining the type of the interface module by determining a communications protocol, determining the type of the interface module by determining a dedicated sideband interface, and combinations thereof.

15. The method of claim 12, wherein the creating the virtual IHS comprises cloning a pre-made virtual IHS from a database including a plurality of virtual IHS templates, wherein the plurality of virtual IHS templates are based on a vendor, a service operator, and a tuner type.

16. The method of claim 12, wherein the creating the virtual IHS for each at least one output of the interface module comprises creating a virtual IHS for each tuner included in the interface module.

17. An information handling system (IHS) comprising:
a plurality of content acquisition software modules that are each configured to receive a content feed signal from at least one content provider device through an external network and convert the content feed signal to an audio stream and a video stream;
a plurality of virtual IHSs, wherein each virtual IHS was created from a library of pre-made virtual IHSs based at least in part on a tuner included in one of the plurality of content acquisition software modules, and wherein each virtual IHS is configured to retrieve and install content provider software from one of the plurality of content provider devices such that the virtual IHS is configured to receive and transmit the audio stream and the video stream from at least one of the plurality of content acquisition software modules, and wherein each virtual IHS is configured to operate such that that virtual IHS appears as a set-top box to the one of the plurality of content provider devices over the external network;
a switch coupling the plurality of content acquisition software modules to the plurality of virtual IHSs, wherein the switch is configured to couple any of the plurality of content acquisition software modules to any of the plurality of virtual IHSs;
at least one digital content server coupled the plurality of virtual IHSs and configured to receive the audio streams and video streams transmitted from the virtual IHSs and transmit the audio streams and video streams to at least one display through an internal network.

18. The system of claim 17, wherein the plurality of content acquisition software modules are each configured to receive the signal from a different one of a plurality of content provider devices.

19. The system of claim 17, further comprising:
a plurality of digital content servers, wherein each digital content server is configured to couple a respective virtual IHS to at least one display.

20. The system of claim 17, further comprising:
a local storage configured to record and play back at least part of the content feed signal received from the content provider; and
a virtual IHS management software engine that is configured to resolve recording conflicts.

* * * * *